March 27, 1934.  C. H. HAVILL  1,952,798
PROPELLER
Filed Jan. 16, 1930  3 Sheets-Sheet 1

Inventor
Clinton H. Havill
By
Cameron, Kerkam & Sutton
Attorneys

March 27, 1934.  C. H. HAVILL  1,952,798
PROPELLER
Filed Jan. 16, 1930   3 Sheets-Sheet 2

March 27, 1934.   C. H. HAVILL   1,952,798
PROPELLER
Filed Jan. 16, 1930   3 Sheets-Sheet 3

Inventor
Clinton H. Havill
By
Cameron, Kerkam & Sutton.
Attorneys

Patented Mar. 27, 1934

1,952,798

UNITED STATES PATENT OFFICE 1,952,798

PROPELLER

Clinton H. Havill, Orange, N. J., assignor to Eclipse Aviation Corporation, East Orange, N. J., a corporation of New Jersey Application January 16, 1930, Serial No. 421,296

22 Claims. (Cl. 170—162)

This invention relates to propellers and more particularly to a propeller of the type wherein the pitch of the blades is variable during rotation thereof.

Variable pitch propellers of the above character possess certain marked advantages over propellers having non-adjustable blades or propellers which are so constructed that the pitch can only be changed when the propeller is not in operation, and especially is this true in the case of propellers for aircraft, wherein the adjustability of the pitch of the blades results in increased propeller efficiency under variable flying conditions. Accordingly, various means have heretofore been proposed whereby variations in the pitch of the propeller blades may be secured during flight. For the most part, such means have been embodied as manually operable devices, employing complicated gearing and control mechanism which is not only bulky and heavy, but which is not always positive in operation due in part to the enormous pressures on portions of the mechanism because of the effect of centrifugal force during rotation of the propeller at high speed. Proper adjustment of the pitch of the blades, when using such devices, depends entirely upon the skill of the operator, and due to variable flight conditions which are always present in the case of propellers installed on aircraft, it is impossible to manually adjust the pitch of the blades whereby the propeller will operate at its maximum efficiency at all times.

It has also been proposed, heretofore, to provide propellers which are so constituted that the pitch of the blades is varied in response to variations in the speed of the engine driving the propeller, and while such propellers possess the advantage of automatic pitch-variation, they have the disadvantage of not operating at maximum efficiency for a given input energy during all conditions such as changes in airspeed, air density, input power, etc., which are encountered during flight.

It is accordingly one of the objects of the present invention to provide a novel variable pitch propeller which is so constructed as to overcome the disadvantages heretofore mentioned.

Another object of the invention is to provide a propeller embodying novel means for varying the pitch of the propeller blades.

A further object is to provide, in a propeller of the variable-pitch type, novel means responsive to the thrust of the propeller for changing the pitch of the blades.

Another object is to provide a novel propeller assembly of the above character wherein the pitch of the blades will be automatically altered in response to variable flight conditions to cause the propeller to operate at its maximum efficiency at all times.

Other objects and novel features of the invention will appear more fully hereinafter in the following detailed description taken in connection with the accompanying drawings. It is to be expressly understood, however, that the drawings are for purposes of illustration only, and are not designed as a definition of the limits of the invention, reference being had for this purpose to the appended claims.

In the drawings, wherein like reference characters refer to like parts throughout the several views;—

A propeller embodying the present invention is illustrated as comprising a plurality of propeller blades, 6, a portion only of the latter being shown in order to employ a large scale drawing. Blades 6 are adapted to be driven by a rotatable driving shaft 7, which in the case of aircraft installations may be a member drivably connected to the crankshaft of the engine, the pitch of said blades being adjustable in response to the thrust thereof by means which will be described hereafter in detail.

Figure 2:
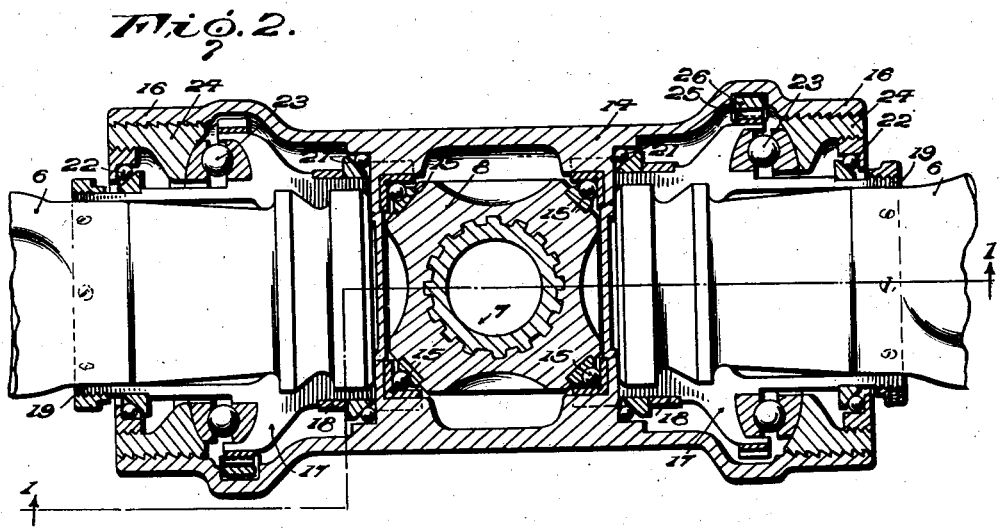
Fig. 2 is a sectional end view taken on line 2—2 of Fig. 1.
Figure 3:
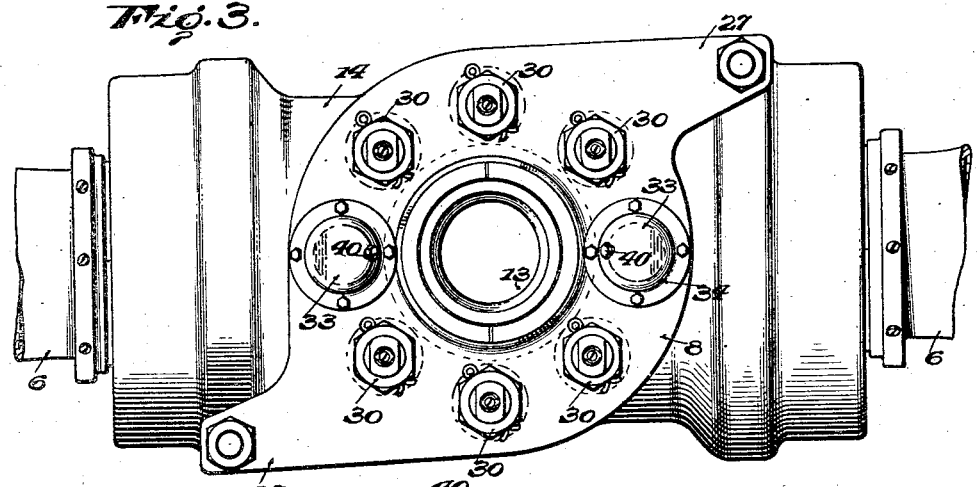
Fig. 3 is an end view of the parts shown in Fig. 1.

Means are provided for drivably connecting the blades 6 to shaft 7. In the form shown, such means are constituted by a driving block or member 8 which is drivably connected in any suitable manner, as by splines, with the member 7, and is held on said shaft by means of front and rear cones 9 and 10 respectively, which cones are brought into firm engagement with beveled faces 11 and 12 of the block by a nut 13 threaded and suitably locked on the outer end of member 7. Surrounding block 8, and drivably connected thereto, is a main hub forging or member 14 which is preferably so mounted as to be axially movable with respect to the block, a plurality of ball bearings 15 (Fig. 2) being interposed between these two members in order to permit such movement to take place in a substantially frictionless and efficient manner.

The hub 14 is formed to provide a plurality of sockets 16 which are adapted to house the roots of blades 6, said roots being so mounted in the sockets as to be rotatable with respect thereto. As illustrated, the root end of each blade is provided with a root housing 17 which is preferably made in two halves for ease of assembly, the two halves being securely held together by means of a clamping ring 18 surounding the inner end of the root housing and a clamp nut 19 surrounding the outer end of the two halves of said housing. A set screw 20 may be provided for locking the nut 19 in position on member 17 if desired. Ball bearings 21 and 22 are preferably provided between the root housing and the hub socket to facilitate relative rotation between the blade and socket, and a thrust bearing 23 is mounted between a collar 17ª, on the root housing, and an annular nut 24 threaded into the outer end of socket 16. A ring gear 25 surrounds and is carried by each of the blade root housings for a purpose which will appear more fully hereinafter.

Figure 1:
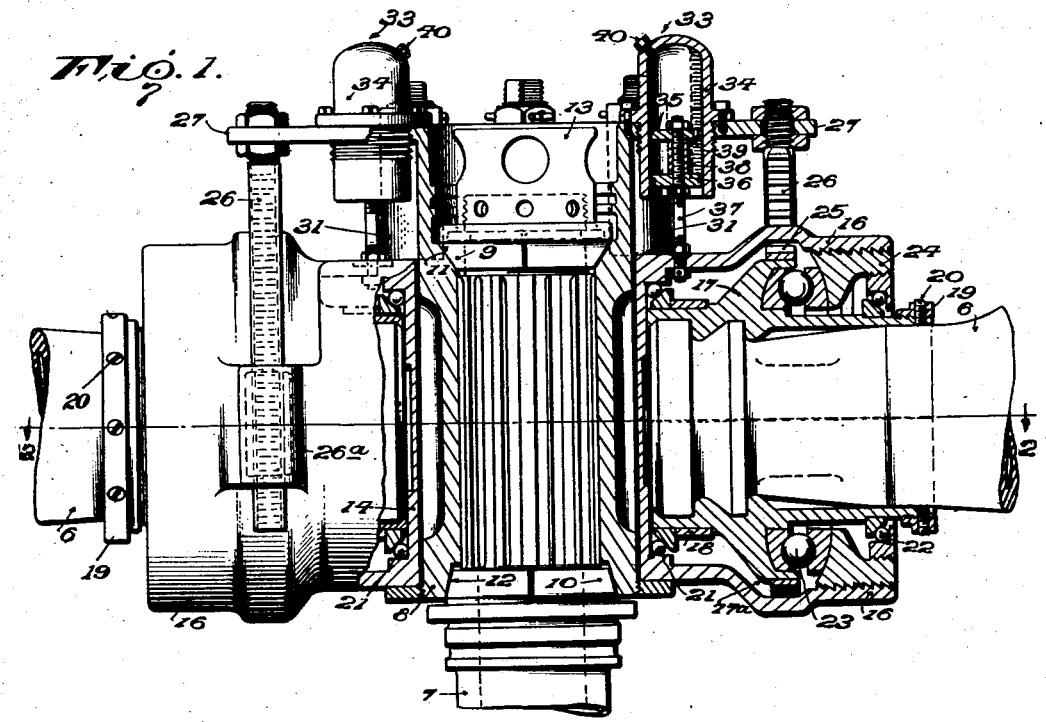
Fig. 1 is a top plan view partly in section, and with parts broken away, of a propeller embodying the present invention.

In operation the blades 6 will be rotated in the usual manner by the driving shaft or member 7. However, due to the thrust or forward push or pull exerted by the rotating blades on the hub 14, said hub will move axially with respect to the driving member 7, i. e. upwardly, as viewed in Fig. 1, such movement being facilitated by the interposition of the bearings 15 between the hub 14 and the driving block 8. Such thrust-responsive movement is employed in accordance with the present invention, for changing the pitch of the blades in order to secure increased propeller efficiency. In the illustrated embodiment, the pitch-changing mechanism includes a plurality of racks 26, carried by laterally extending ears 27 secured to the forward end of driving block 8, said racks extending through lugs or bosses 26ª (Fig. 4) formed integrally with sockets 16 and into mesh with the ring gears 25. The latter gears will accordingly travel along the racks during forward movement of the hub whereby the blades 6 will be rotated to change the pitch thereof.

Figure 4:
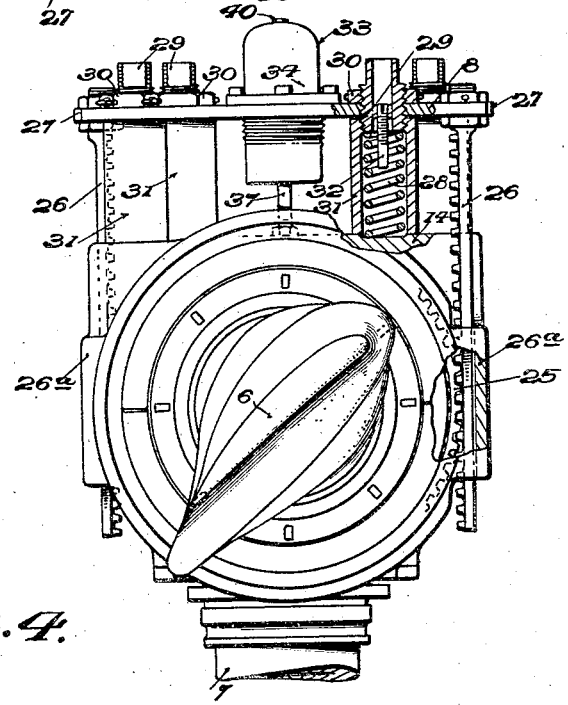
Fig. 4 is a side view, partly in section of the structure shown in Fig. 3 and including the broken away portion of one blade.

Means are provided for yieldingly resisting the thrust-responsive movement of the hub, and in the form shown such means is constituted by a plurality of suitable resilient members such as springs 28, Fig. 4, which are operatively positioned between the hub 14 and driving block 8, and which are arranged in a circle that is concentric with respect to the driving member 7. A hollow nut 29 may be employed for adjusting the tension of the spring, together with any suitable means such as nut 30 for locking the nut 29 in its adjusted position. The action of springs 28 may be supplemented, if desired, by rubber sleeves 31, it being borne in mind that these resilient members are so designed as to arrest movement of the hub at a position such that the pitch of the blades will be that required to yield maximum propeller efficiency for the particular power input. The above described resilient means normally maintain the hub and blades in the position indicated in Fig. 1 wherein the pitch angle of said blades is a maximum. A suitable adjustable stop member such as is shown at 32 (Fig. 4), is preferably provided to limit the thrust-responsive movement of the hub whereby changes in the pitch angles of the blades are limited, it being pointed out that as the hub moves forwardly along the driving shaft, the pitch of said blades is decreased.

Means are preferably provided whereby "hunting", or rapid backward and forward movements of said hub are substantially eliminated or damped. In the form shown such means are constituted by a plurality of dash-pots 33. Preferably, each of these dash-pots comprises a cylinder 34 carried by the driving block 8, and cooperating pistons 35 and 36 carried by a rod 37 which is rigidly attached to the hub in any suitable manner. As shown, the pistons are spaced apart by means of a spacing sleeve 38, a port 39 being provided in the upper piston permitting fluid to flow from one side thereof to the other. Preferably, a small quantity of fluid, such as mercury, for example, is placed within the cylinder, after removal of the filling plug 40. During rotation of the propeller, the liquid will occupy the position indicated in Fig. 1, due to centrifugal force, and due to the pressure of this liquid and due also to the pressure of the air within the cylinder above and below the piston 35, slight, rapid variations in the movement of the hub will be substantially eliminated and damped, the dash-pot thus functioning as a combined hydraulic and pneumatic stabilizer. Such a construction avoids high frequency, low amplitude pitch variations, which would otherwise result in a propeller the operation of which would be noisy and objectionable to a pilot, in the case of aircraft installations.

Figure 5:
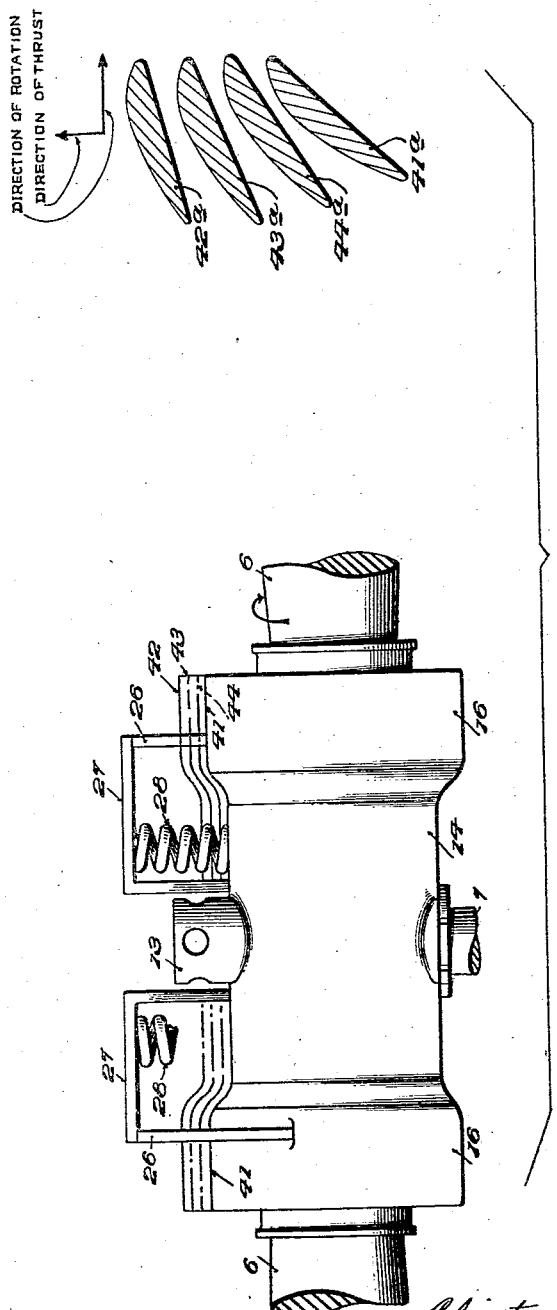
Fig. 5 is a diagrammatic view illustrating the operation of a propeller embodying the present invention.

The operation of a propeller embodying the present invention is diagrammatically shown in Fig. 5. As heretofore pointed out, the blades, at rest, exert no thrust on the hub and the resilient members 28 and 31 will accordingly be operable to maintain the hub in its most extreme rearward position, the forward portion of the hub during this condition being indicated at 41, and the corresponding position of the blades being indicated by the section 41ª, such section being taken through the blade in a plane perpendicular to the longitudinal axis thereof. Since the pitch angle of the blade is the angle which the blade makes with the plane of rotation, it will be observed that the pitch is a maximum when the propeller is at rest, this angle being theoretically or experimentally determined, for the existing installation and the blades set at this pitch during assembly of the propeller. It is also pointed out that this initial angle is such that the various pitch angles which the blades subsequently assume in response to variable flight conditions, will cause the propeller to operate at its maximum efficiency for the particular conditions imposed.

When the propeller is rotating and the aircraft on which it is mounted is still stationary, the thrust exerted by the blades on the hub will be a maximum and as a consequence thereof, the hub will be moved forwardly until such movement is arrested by the stops 32, Fig. 4. This position of the hub is indicated at 42, while the corresponding position of the blades is shown at 42ª wherein the pitch is a minimum. Inasmuch as the propeller offers less resistance at a low pitch setting, the speed of the engine will increase without substantially any additional energy input thereto and this will cause the blades to exert an increased thrust which will be available during take-off of the aircraft.

During normal cruising in level flight, the propeller input energy is materially less than that during take-off with the result that less thrust will be required to maintain the desired speed. Resilient members 28 and 31 will accordingly adjust the hub to the position 44, wherein the thrust of the blades will be balanced by the pressure of these members, the propeller blades then assuming an increased pitch, as indicated by the section 44ª. Inasmuch as this pitch setting is automatically attained in accordance with the existing conditions and since this angle is greater than that usually employed, the propeller will exert an increased thrust for the stated input energy, the result being a noticeable increase in propeller efficiency.

In ascending, assuming that the engine throttle remains unchanged, the thrust of the propeller will increase because of the falling off in speed of the aircraft. The hub will accordingly move forwardly to a position intermediate the positions 42 and 44 wherein the pitch of the blades will be decreased. As during the take-off condition, this will result in an increased thrust and propeller efficiency. Due to the construction proposed, the velocity of the aircraft during ascending will be greater under these conditions than if the pitch of the propeller were fixed at all times.

Should the pilot desire to descend or dive, again assuming that the engine throttle is unchanged, the increase in speed will result in a decrease in propeller thrust, and the blades will accordingly assume some position intermediate the sections 44ª and 41ª it being understood that the hub will be moved rearwardly by the members 28 and 31. Since the pitch of the blades is now increased, the propeller will offer an appreciable resistance or load to the engine which will prevent the speed of the latter from attaining a dangerously high value especially during a steep dive.

In level flight, at top speed, a maximum input energy is imparted to the propeller, whereby the latter will rotate at high speed and exert an increased thrust on the hub. The forward position of the hub, for this condition would be that indicated by the reference numeral 43 while the blades would assume a low pitch angle in accordance with the section indicated at 43ª. A still greater thrust will then result because of the decreased load offered by the propeller to the engine causing an increase in propeller speed for the power input.

There is thus provided a novel propeller of the variable-pitch type wherein the pitch of the blades is altered in a simple and efficient manner. By employing means responsive to the thrust of the propeller for varying the pitch of the blades, substantially all of the variable forces acting on the blades during rotation thereof are included, which results in a propeller the blades of which automatically assume such positions as to yield a maximum thrust for every variable condition encountered during flight, the efficiency of such propeller for a given energy input being thus automatically maintained at a maximum at all times. The provision of the dash-pots substantially prevent slight and rapid fluctuations of the pitch-changing means whereby noisy and inefficient operation is prevented. It will be understood, however, that the dash-pots may be eliminated in certain installations if desired.

While there has been shown and described only one form of the invention, it is to be expressly understood that the same is not limited thereto, but may be embodied in various mechanical forms. For example, various types of resilient means and dash-pots, other than those illustrated may be employed for yieldingly opposing movement of the thrust-responsive means. Means other than the gear and rack mechanism may be utilized for rotating the blades during movement of the hub, and various other changes in the details of construction and arrangement of the component parts may be made as will now be apparent to those skilled in the art, without departing from the scope of the invention. It will also be understood that the invention is not limited to use with aeroplane propellers. Reference will therefore be had to the appended claims for a definition of the limits of the invention.

What is claimed is:—

1. A device of the class described comprising a hub, a plurality of axially aligned blades carried thereby, a driving shaft, means for drivably connecting said shaft and hub, said hub being axially and rectilinearly movable of said connecting means in response to the thrust of said blades, and means operable during such movement of the hub to change the pitch of said blades.

2. A propeller for aircraft comprising a plurality of axially aligned blades, a hub carrying said blades, driving means for said hub, said hub being movable rectilinearly of said driving means in accordance with the thrust of the blades, means for varying the pitch of the blades during such movement of the hub, and means yieldingly resisting the thrust-responsive movement of the hub.

3. A device of the class described comprising a hub, a plurality of axially aligned propeller blades carried thereby, driving means for said hub, said hub being relatively movable rectilinearly and longitudinally with respect to said driving means in response to the thrust of said blades, and relatively stationary means cooperating with said blades during such movement to rotate said blades with respect to the hub to change the pitch.

4. A device of the class described comprising a driving member, a plurality of axially aligned propeller blades, means for drivably connecting said blades and member, said means being axially and rectilinearly movable of said member in response to the thrust of said blades, means coacting with said blades to change the pitch thereof during such axial movement of said member, and means for yieldingly resisting thrust-responsive movement of said first-named means.

5. A propeller for aircraft comprising a driving shaft, a driving block drivably connected to said shaft, a plurality of ears extending laterally of said driving block, a plurality of blades, a hub for drivably connecting said blades and block, said hub being rectilinearly movable with respect to said block in response to the thrust of said blades, a member carried by each of said blades, and another member carried by each of said ears and cooperating with said first members to change the pitch of said blades during such rectilinear thrust-responsive movement of said hub.

6. A propeller having a plurality of blades, a rotatable shaft, means for drivably connecting said blades and shaft, said means being automatically movable rectilinearly and longitudinally of said shaft in response to the thrust of the blades, means operable during such thrust-responsive movement of said connecting means for changing the pitch of said blades, means yieldingly resisting thrust-responsive movement of said connecting means, and a dash-pot for dampening abrupt movement of said connecting means relative to the shaft.

7. In combination with a rotatable shaft, a hub carried thereby and longitudinally and rectilinearly movable with respect thereto, a plurality of propeller blades rotatably mounted in said hub, means for limiting the longitudinal movement of the hub with respect to the shaft, means including a plurality of resilient members arranged in an annular series around said shaft for normally maintaining said hub in one limiting position of its longitudinal movement, and means operable during longitudinal movement of the hub with respect to said shaft for varying the pitch of said blades.

8. In combination, a plurality of propeller blades, a power driven rotatable shaft, means including a hub for drivably connecting said shaft and blades, means for mounting said hub on the shaft for longitudinal movement with respect thereto, a member secured to said shaft and extending laterally thereof, mechanism disposed on either side of said shaft and interconnecting each blade and said member to change the pitch of the blades during longitudinal movement of the hub, and resilient means normally tending to maintain said hub in one position of its longitudinal movement.

9. In combination, a rotatable shaft, a plurality of propeller blades, a hub having a pair of axially aligned sockets for drivably connecting said shaft and blades said hub being automatically movable longitudinally of said shaft in accordance with the thrust of the blades to vary the pitch of the latter, means interconnecting said blades and shaft and operable to vary the pitch of the blades during longitudinal thrust-responsive movement of the hub, and a plurality of resilient members disposed in an annular series about said shaft for yieldingly resisting longitudinal movement of the hub in one direction.

10. A propeller of the class described comprising a plurality of blades, a rotatable shaft, means including a hub for drivably connecting said blades and shaft said hub being automatically movable longitudinally of said shaft, a member secured to said shaft, a plurality of resilient members interposed between said first-named member and said hub and arranged in an annular series around the shaft, and means interconnecting said first-named member and said blades for varying the pitch of the latter during longitudinal movement of the hub.

11. In combination, a plurality of propeller blades, a hub having a plurality of radially extending sockets, means for rotatably securing said blades in said sockets, a rotatable shaft, means for drivably connecting said hub to said shaft for rotatable and longitudinal movement, a member secured to said shaft, means including resilient devices interposed between said member and hub for normally maintaining the latter in one position longitudinally of said shaft, and means interconnecting said member and blades and passing through said hub for changing the pitch of the blades during longitudinal movement of the hub.

12. A propeller hub comprising a driving block adapted to be drivably connected to a rotatable shaft, a hub forging surrounding said block, means for drivably connecting said forging and block for relative longitudinal movement, a plurality of radially extending sockets provided in said forging for rotatably receiving propeller blades, resilient means interposed between said hub forging and said driving block for normally maintaining said hub forging in one position of its longitudinal movement, and means interconnecting said blades and driving block for changing the pitch of said blades during longitudinal movement of the hub forging with respect to said driving block.

13. A propeller hub comprising a driving block adapted to be drivably connected to a rotatable shaft, a hub member surrounding said block and rotatable therewith, said hub member being movable axially of said driving block, a plurality of bearings interposed between said driving block and hub member, means including axially aligned sockets for rotatably mounting a plurality of propeller blades in said hub member, means for limiting the axial movement of said hub member and means operable during such movement and interconnecting said driving block and blades for changing the pitch of the latter.

14. A propeller hub comprising a driving block adapted to be drivably connected with a rotatable shaft, a hub member rotatable with said block and axially movable with respect thereto, said hub member being provided with a plurality of axially aligned sockets for rotatably receiving a plurality of propeller blades, means comprising a plurality of coil springs interposed between said driving block and hub member for normally yieldingly resisting longitudinal movement of the hub member in one direction said springs being concentrically arranged with respect to said driving block, and relatively movable means interconnecting said driving block and blades for changing the pitch of the latter during longitudinal movement of the hub member relative to the driving block.

15. A propeller comprising a shaft, a driving member secured thereto, a hub member rotatable with said driving member and longitudinally movable with respect thereto said hub member being provided with a plurality of radially extending sockets, a sleeve rotatably mounted in each socket and adapted to receive a propeller blade, means for yieldingly opposing longitudinal movement of the hub member in one direction, and means interconnecting said sleeves and driving member for rotating said sleeves and blades mounted therein during longitudinal movement of said hub member.

16. In combination, a rotatable shaft, a propeller hub adapted to be removably secured to said shaft, said hub including a driving block having a laterally extending flanged portion at either end thereof, a hub member surrounding said driving block and longitudinally movable thereof between said flanged portions, one of said last-named portions serving to limit longitudinal movement of the hub in one direction, a plurality of bearings interposed between said driving block and said hub member, a plurality of radially extending sockets provided in said hub member, a propeller blade rotatably mounted in each socket, a plurality of springs interposed between the other of said flanged portions and said hub member for yieldingly resisting longitudinal movement of the hub in one direction, said springs being laterally disposed with respect to the axis of the rotatable shaft, means carried by said last-named flanged portion for positively limiting longitudinal movement of the hub in said one direction, and means interconnecting said driving block and said blades for rotating the latter to change the pitch thereof during longitudinal movement of the hub in either direction.

17. An aircraft propeller comprising a plurality of blades, driving means therefor including a shaft, means actuated by the thrust of the blades independently of the torque of said shaft for changing the pitch of the blades, and means including a plurality of coil springs for yieldingly resisting operation of said thrust-actuated means, said springs being arranged in an annular series around said shaft.

18. A propeller for aircraft having a plurality of blades, driving means therefor including a shaft and a hub movable longitudinally and rectilinearly of said shaft, means including said hub and responsive to the thrust of the latter of the blades for changing the pitch of the latter, and dash-pot means for cushioning longitudinal movement of the hub during operation of said thrust-responsive means.

19. A propeller of the class described comprising a rotatable shaft, a hub drivably connected thereto, a plurality of blades rotatably mounted in the hub, said hub being longitudinally movable but non-rotatable with respect to said shaft in response to the thrust of the blades, a member secured to said shaft and positioned rearwardly of said hub, means actuated by the thrust-responsive movement of the hub for decreasing the pitch of said blades, resilient means positioned forwardly of the hub and normally operable to maintain said hub in engagement with said member whereby the pitch of the blades will be a predetermined maximum, and stop means for positively limiting forward thrust-responsive movement of said hub, whereby the reduction in the pitch of the blades will be predetermined.

20. In combination, a rotatable shaft, a propeller hub adapted to be secured to said shaft, said hub including a driving block having a laterally extending flanged portion at either end thereof, a hub member surrounding said driving block and longitudinally movable thereof between said flanged portions, one of said last-named portions serving to limit longitudinal movement of the hub in one direction, a plurality of bearings interposed between said driving block and said hub member, a plurality of radially extending sockets provided in said hub member, a propeller blade rotatably mounted in each socket, a plurality of springs interposed between the other of said flanged portions and said hub member for yieldingly resisting longitudinal movement of the hub in one direction, said springs being laterally disposed with respect to the axis of the rotatable shaft, and means interconnecting said driving block and said blades for rotating the latter to change the pitch thereof during longitudinal movement of the hub in either direction.

21. A propeller comprising a plurality of blades, driving means therefor, means for varying the pitch of said blades in accordance with the thrust thereof, said means including a member rectilinearly movable with respect to said driving means, and means including adjustable stop members for limiting the movement of said member relative to the driving means in the direction to reduce the pitch of the blades.

22. In a propeller, the combination with a rotatable power driven shaft, of a plurality of blades, a hub for drivably connecting said blades and shaft, said hub being movable rectilinearly of said shaft, means for varying the pitch of said blades in accordance with the thrust thereof, said last named means including said hub, and adjustable stop means for predetermining the extent of operation of said pitch varying means.

CLINTON H. HAVILL.